US007099841B1

(12) United States Patent
Hall et al.

(10) Patent No.: US 7,099,841 B1
(45) Date of Patent: Aug. 29, 2006

(54) METHODS AND SYSTEMS FOR TRADING PERMANENT SEAT LICENSES

(75) Inventors: Brandon Lee Hall, Cary, NC (US); Mark Henry Stonefield, Apex, NC (US)

(73) Assignee: Sports Securities, Inc., Apex, NC (US)

( * ) Notice: Subject to any disclaimer, the term of this patent is extended or adjusted under 35 U.S.C. 154(b) by 1073 days.

(21) Appl. No.: 09/632,699

(22) Filed: Aug. 4, 2000

(51) Int. Cl.
*G06F 17/60* (2006.01)

(52) U.S. Cl. ............................................ 705/37; 705/39

(58) Field of Classification Search .................. 705/36, 705/37
See application file for complete search history.

(56) References Cited

U.S. PATENT DOCUMENTS

| | | | |
|---|---|---|---|
| 4,674,044 A | 6/1987 | Kalmus et al. | |
| 5,168,446 A | 12/1992 | Wiseman | |
| 5,835,896 A | 11/1998 | Fisher et al. | |
| 5,873,071 A | 2/1999 | Ferstenberg et al. | |
| 5,918,218 A | 6/1999 | Harris et al. | |
| 5,950,176 A | 9/1999 | Keiser et al. | |
| 5,963,923 A | 10/1999 | Garber | |
| 6,014,643 A | 1/2000 | Minton | |
| 6,029,146 A | 2/2000 | Hawkins et al. | |

OTHER PUBLICATIONS http://www.google.com/search?hl=en&lr=&ie=ISO-8859-1&q= permanent+seat+licenses+exchange&btnG=Google+Search.*
http://www.shareholder.com/ebay/annual/1999_annual_10K.pdf.*
* cited by examiner

*Primary Examiner*—Richard C. Weisberger
(74) *Attorney, Agent, or Firm*—Alston & Bird LLP (57) ABSTRACT

A method of trading seat licenses over a computer network is provided whereby a seat license is listed for sale by a seller on a seat license exchange hosted by an intermediary, wherein the seat license exchange is conducted through a central computer over the computer network and the seat license is issued by an issuer and has an asking price determined by the seller. At least one bid for the seat license is received over the computer network from the bidder, wherein the bidder offering a first bid for the seat license, that is at least equal to the asking price thereof, is designated as the buyer of the seat license. A trade is thereafter initiated whereby the seat license listing is removed from the seat license exchange and a trade status is established. A title to the seat license is then directed from the seller and received by the intermediary. Concurrently, a remittance at least equal to the first bid is directed from the buyer and received by the intermediary. Upon receiving a final approval of the trade from the issuer, the trade is completed by directing the title to the seat license to the buyer, directing a first portion of the remittance to the intermediary, directing a second portion of the remittance to the seller, and notifying the issuer of the completion of the trade. Associated methods and systems are also provided.

56 Claims, 3 Drawing Sheets

METHODS AND SYSTEMS FOR TRADING PERMANENT SEAT LICENSES

FIELD OF THE INVENTION

The present invention relates to trading systems and, more particularly, to methods and associated systems for trading permanent seat licenses.

BACKGROUND OF THE INVENTION

Permanent seat licenses, also known, for instance, as personal seat licenses, Stadium Builder licenses (SBL), Charter Ownership agreements (COA), Charter Seat licenses (CSL), and Preferred Access Speedway Seating (PASS), are a relatively recent innovation wherein, for example, sports teams sell "seat licenses" to fans desiring admission tickets to team events. Generally, the seat license for a particular seat within the stadium or arena enables and/or requires the holder of that license to purchase season tickets to team events. The season ticket, in turn, gains the holder admission to individual team events during the course of the season where the holder is able to sit in the particular seat. However, permanent seat licenses (referred to herein as "PSL's") are also an important source of revenue for the sports team issuing the PSL's. This revenue can be used by the team to, for example, subsidize the construction of new facilities or for other purposes requiring capital outlay. Note that the PSL's may be issued by entities other than just sports teams. For example, the sports team may often act in partnership with a government entity, where the partnership issues the PSL's. In other instances, the government entity may build, own, and operate the stadium independently of the sports team and may thus issue the PSL's independently thereof. Further, the venue may be owned by an entity separate from both the sports team and the government entity and it is the separate entity which issues the PSL's. Note further that the PSL concept as described herein may be applicable to venues for other events besides sports such as, for example, theaters or the like. Thus, it will be understood by one skilled in the art that the PSL concept may have wide and varied applicability.

PSL's are generally offered directly to the public by the sports team (referred to herein as the "issuer"). These PSL's often have prices ranging from hundreds to many thousands of dollars. Sometimes, for a variety of reasons, such as moving from the area or losing interest in the team, holders may sometimes wish to sell their PSL's after buying them from the issuer. A problem herein lies that, since a PSL is a niche commodity, there is no established resale market for the product. In some instances, computer bulletin boards and newspaper classified ads are utilized to find a subsequent buyer. However, such transactions are often laden with uncertainty for both the seller and the buyer. For instance, due to the cost of the PSL's, a buyer may often have to procure financing, which may delay the transaction. If the seller is desperate to sell the PSL's, he may arrange to finance all or part of the sale to the buyer, which may further lead to uncertainty for the seller recouping his money from the buyer. Likewise, the buyer is faced with uncertainty as to, for example, whether the seller is the rightful owner of the PSL's or whether the seller will deliver the PSL's upon the buyer paying the purchase price. Sometimes, the buyer may be faced with the uncertainty that the PSL's correspond to seats that do not have the view of the playing field that the buyer desires or that the seats corresponding to the PSL's have a view that may adversely affect the value of the PSL's.

In other instances, the PSL's may be offered for sale by the seller independently of the current season's tickets, wherein the buyer would not be able to obtain tickets until the following season. This situation may often not be revealed to the buyer, or the buyer may forget to inquire about this detail, until the transaction has been completed.

The PSL transaction may further include mutual uncertainties for both the buyer and the seller. For instance, since there is no established market, it is often difficult for both the seller and the buyer to ascertain a going market price for the PSL's. Such a market price may also be affected by performance factors with the team itself. For example, PSL's may rise significantly in price if the team has come off a successful championship season or has recently built a new stadium or arena. Conversely, the value of a PSL may drop significantly if the team is on a losing streak or is otherwise forecast to perform poorly in the future. In addition, there may be instances where the transaction between the buyer and the seller occurs over a distance and the parties cannot meet in person. In these instances, the uncertainties facing both the buyer and seller as to the reliability of the transaction may take on a greater significance. Further, the issuer typically maintains records of the current ownership of the respective PSL and the seller and/or the buyer may be required to notify the issuer of the ownership change at the time of the transaction, as well as to pay an associated fee for the transfer. Issuer requirements with regard to the transaction may vary between issuers and may also comprise a procedure which is unknown to the parties.

Thus, there exists a need for a medium for buying and selling PSL's in which reasonable assurances are provided to both the buyer and the seller concerning important aspects of the transaction, for example, that the seller is the rightful owner of the PSL and that the buyer is capable of paying the purchase price. Such a medium should also desirably be able to inform the parties of at least a best estimate of a current market price for the PSL's, be able to let the buyer evaluate the views from the corresponding seats, and be able inform the buyer and seller as to the transaction requirements imposed by the respective issuer. It may also be desirable for the medium to incorporate provisions for facilitating the transaction wherein the seller can submit the PSL and the buyer can submit the corresponding remittance to a trusted intermediary. The medium should also desirably be able to account for the current season's tickets corresponding to the PSL together with or independently of the sale of the PSL.

SUMMARY OF THE INVENTION

The above and other needs are met by the present invention which, in one embodiment, provides a method of trading seat licenses over a computer network, more particularly, on a seat license exchange being conducted through a central computer over the computer network. A seat license is first listed for sale by a seller on the seat license exchange which is hosted by an intermediary. The seat license is typically issued by an issuer and has an asking price determined by the seller. At least one bid is then received for the seat license over the computer network from a bidder. Where a bid is at least equal to the asking price of the seat license, the corresponding bidder offering the bid is designated as the buyer of the seat license. A trade is then initiated, whereby the seat license listing is removed from the seat license exchange and a trade status is established. Accordingly, a title to the seat license is directed from the seller and received by the intermediary. A remittance at least equal to the buyer's bid is also directed from the buyer and received by the intermediary. Upon receiving a final approval of the trade from the issuer, the trade is completed by directing the title to the seat license to the buyer, directing a first portion of the remittance to the intermediary, directing a second portion of the remittance to the seller, and notifying the issuer of the completion of the trade.

According to some embodiments of the present invention, the seller may first be required to be registered prior to listing the seat license for sale, whereby seller information is received by the intermediary along with seat license information and associated ticket information. Further, the intermediary may confirm with the issuer that the seller has a proper title to the seat license prior to listing the seat license for sale. In some instances, the seller may also be allowed to post a notice of willingness to list an unlisted seat license for sale upon a solicitation from a bidder, wherein the notice is generally accessible to the bidder. Still further, the bidder must register with the intermediary by providing bidder information prior to the intermediary receiving the bidder's bid. In some instances, the bidder is required to be verified as being capable of remitting a certain bid amount prior to allowing the bidder to place a bid. In other instances, the bidder may be allowed to list a solicitation for an unlisted seat license, for example, wherein a seat license desired by the bidder is not listed on the seat license exchange, wherein the solicitation is typically accessible to the seller.

According to alternate embodiments of the present invention, the seller, in some instances, may be allowed to revise the seat license listing following listing of the seat license. In other instances, the method may further comprise requesting a pre-approval of the trade from the issuer prior to initiating the trade. Where a pre-approval of the trade from the issuer is required and/or requested prior to initiating the trade, the seat license may be relisted on the seat license exchange if the issuer is unwilling to issue a pre-approval. In other instances, a season ticket associated with the seat license may also be directed from the seller to the intermediary following initiation of the trade. If associated season tickets are involved, a supplemental remittance for the season ticket may be directed from the buyer to the intermediary. In such an instance, completing the trade may further comprise directing the season ticket associated with the seat license to the buyer, directing a first portion of the supplemental remittance to the intermediary, and directing a second portion of the supplemental remittance to the seller.

Where the intermediary fails to receive the title and/or the remittance for the PSL within a specified period, the trade may be cancelled. Further, during the course of the trade, the buyer, the seller, and/or the issuer may be allowed access to the trade status over the computer network. The buyer, seller, and/or the intermediary may also be allowed to access the seat license listing, the asking price, and the at least one bid over the computer network. Where the seat license corresponds to a particular seat at a particular venue, the method may further comprise providing a view of the venue from the seat such that the view is accessible over the computer network. Upon completion of the trade, the seat license listing, the asking price, and at least one bid are stored in an archive and the method may further comprise allowing access to the archive over the computer network. In some instances, completing the trade may further comprise directing a third portion of the remittance to the issuer as a payment of a transaction fee. In other instances, the seat license listing may also have other information linked therewith, wherein the other information is associated with the seat license and is accessible over the computer network.

Another advantageous aspect of the present invention comprises a system for implementing the associated method for trading permanent seat licenses as described herein. Such a system may be implemented in computer software, or a combination of computer software and hardware, having one or more processing portions for accomplishing the associated method according to another embodiment of the present invention. In a representative embodiment, a seat license exchange operating over a computer network is initiated and developed on a central computer or computer device that is part of a larger computer network such as, for example, the Internet. Such a central computer or computer device may comprise, for example, a desktop personal computer, a laptop personal computer, a server, a router, a main frame computer or like devices or combinations thereof capable of implementing the described functions as known to one skilled in the art. Once established on the central computer or computer device, the seat license exchange is accessible to a seller through a seller's computer and to a bidder through a bidder's computer, with each of the computers being an integral part of the computer network and communicable with the central computer or computer device through, for example, network communication lines.

To use the system in order to execute a seat license trade, a seller accesses the seat license exchange via the seller's computer over the network communication lines that are in communication with the central computer or computer device. Generally associated with the on-line seat license exchange on the central computer or a computer device are a trade status information module, and a module for collecting both bidder and seller information, and a module for verifying that information. A bidder is thereafter allowed to access the seat license exchange via the bidder's computer over the network communication lines. The issuer may likewise be in communication with the central computer or computer device through the issuer's computer over the network communication lines. These elements, alone or in combination, are capable of implementing the associated method of trading permanent licenses according to embodiments of the present invention. The seat license exchange is generally implemented in computer software, though the seat license exchange may also, in some cases, be implemented by a combination of software and hardware. The information collection and verification modules may produce databases that are generally stored in, for example, a memory device incorporated within or otherwise associated with a central computer or computer device. Further, the trade status information module is typically implemented in software, though this component may be implemented by a combination of software and hardware in some instances. For example, the trade status information module may include or be disposed in communication with a router, server, switch, or the like for appropriately disseminating trade status information. These elements thus form a system having one or more processing portions for implementing the associated method according to embodiments of the present invention.

Thus, embodiments of the present invention provide a medium for buying and selling permanent seat licenses in which reasonable assurances are supplied to both the buyer and the seller regarding the success of the transaction. For example, the buyer is provided with assurances that the seller is the rightful owner of the PSL, while the seller is assured that the buyer is capable of paying the purchase price. Embodiments of the present invention also have provisions for informing the parties of at least a best estimate of a current market price for the PSL's, enabling the buyer to evaluate the view of the playing field from the seat corresponding to the PSL, and informing the buyer and the seller as to transaction requirements imposed by the respective issuer. Since the seller submits the PSL and the buyer submits the corresponding remittance to an intermediary, embodiments of the present invention also provide a "trusted intermediary" facilitating the trade independently of either the buyer or the seller and thereby increasing the parties' confidence in the transaction. Embodiments of the present invention also have provisions for the current season's tickets corresponding to the PSL which may be sold together with or independently of the PSL. Therefore, the methods and systems for trading permanent seat licenses according to embodiments of the present invention provide significant advantages as detailed herein.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
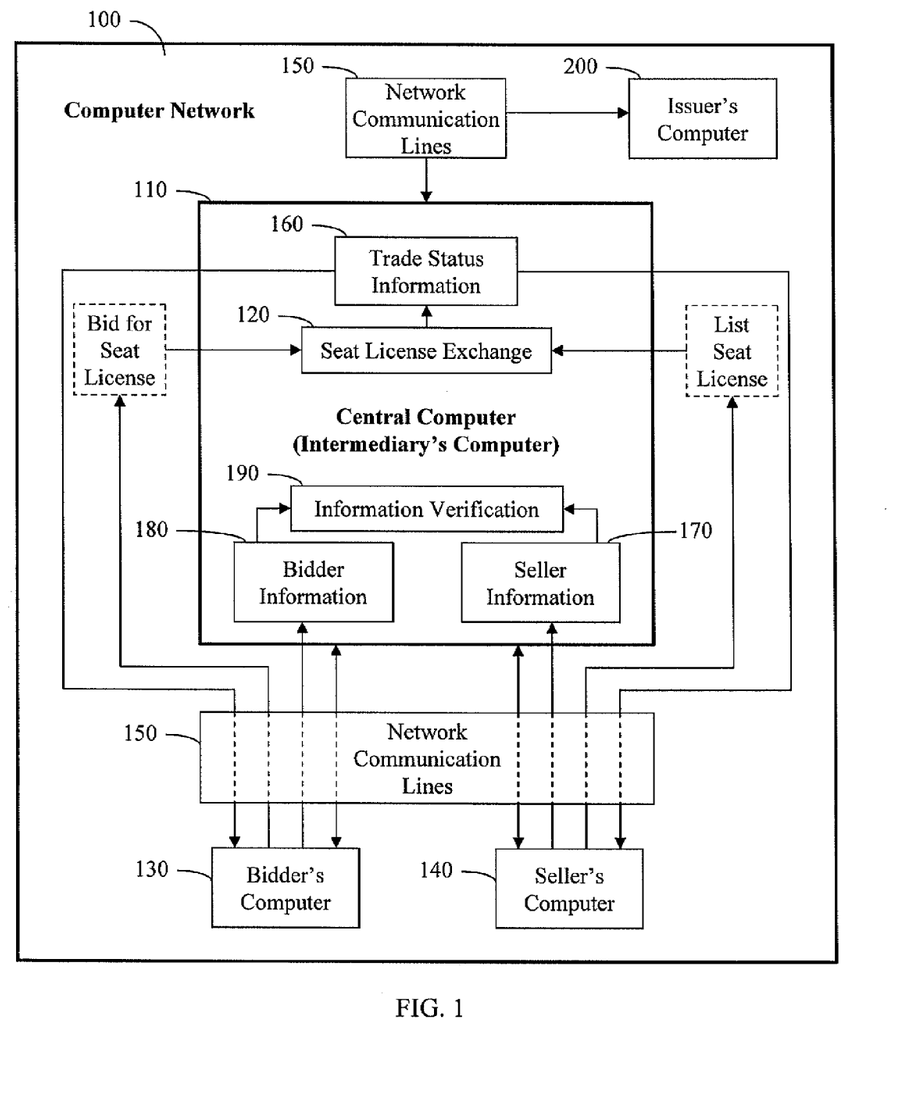
FIG. 1 is a schematic representation of a computer network configured to host a permanent seat license (PSL) exchange according to one embodiment of the present invention.

FIG. 1 is a schematic representation of a seat license exchange operating over a computer network according to one embodiment of the present invention and is representative of a system capable of implementing a method of trading permanent seat licenses in accordance with further embodiments of the present invention. The seat license exchange 120 is initiated and developed on a central computer or other computer device 110 wherein the central computer or other computer device 110 is part of a larger computer network 100 such as, for example, the Internet. Such a central computer or computer device 110, referred to herein as "central computer 110" for convenience and brevity, may comprise, for example, a desktop personal computer, a laptop personal computer, a server, a router, a mainframe computer, or like devices or combinations thereof capable of implementing the functions and methods as described herein as known to one skilled in the art.

Once established on the central computer 110, the exchange 120 is accessible to a bidder through a bidder's computer 130 and to a seller through a seller's computer 140, each of the computers 130, 140 being an integral part of the computer network 100 and communicable with the central computer 110 through, for example, network communication lines 150. Note that, while a simple schematic of several computers in communication with a computer network is presented herein, it is understood that this concept is representative of communication through an Internet site on, for example, the World Wide Web, and may involve many different computers and associated equipment, wherein the concept of communication via the Internet is known to one skilled in the art.

In order to establish the seat license exchange 120 such as, for example, by establishing a listing of seat licenses offered for sale so as to solicit respective bids, a seller accesses the exchange 120 via the seller's computer 140 over the network communication lines 150 that are in communication with the central computer 110. Generally, associated with the exchange 120 on the central computer 110 are a trade status information module 160, a seller information module 170, a bidder information module 180, and an information verification module 190. Further associated with the seat license exchange 120 is an issuer's computer 200 in communication with the central computer 110 through network communication lines 150 for allowing an issuer to communicate with the intermediary and to monitor a trade status via the trade status information module 160.

The seat license exchange 120 is generally implemented in computer software, though the exchange 120 may also, in some cases, be implemented in a combination of software and hardware. The information gathered through the seller information module 170, the bidder information module 180, and the information verification module 190 are generally stored in, for example, one or more databases in a memory device incorporated within or otherwise associated with the central computer 110. Further, the seller information module 170, the bidder information module 180, the information verification module 190, and the trade status information module 160 are typically implemented in software, though these components may be implemented by a combination of software and hardware in some instances. For example, the trade status information module 160 may include or be disposed in communication with a router, server, switch, or the like, for appropriately disseminating trade status information. In addition, the seat license exchange 120 and/or the information verification module 190 may comprise, for instance, a display or other mechanism for presenting text, graphics, audio, or the like to confirm the bidder's and/or seller's information and/or to provide other information associated with the seat license exchange 120. Generally, these elements comprise a system, implemented in computer software or a combination of software and hardware, having one or more processing portions capable of executing embodiments of a method for trading permanent seat licenses according to the present invention. Thus, embodiments of such methods according to the present invention may be implemented by one or more corresponding processing portions of an associated system, wherein each processing portion may comprise a software component, or both a software and hardware component, capable of implementing one or more of the specified functions. Accordingly, the operation of the seat license exchange 120 and its associated elements may be more particularly illustrated from the description of an associated method corresponding to one embodiment of the present invention.

Figure 2:
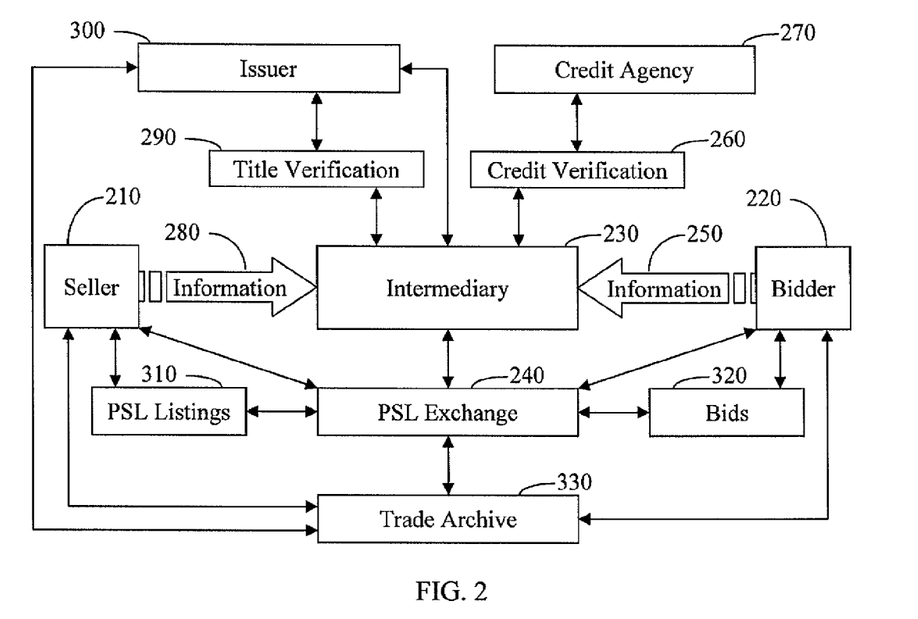
FIG. 2 is a schematic representation of a method of conducting a PSL trade according to one embodiment of the present invention illustrating functions of the intermediary leading up to the trade.
Figure 3:
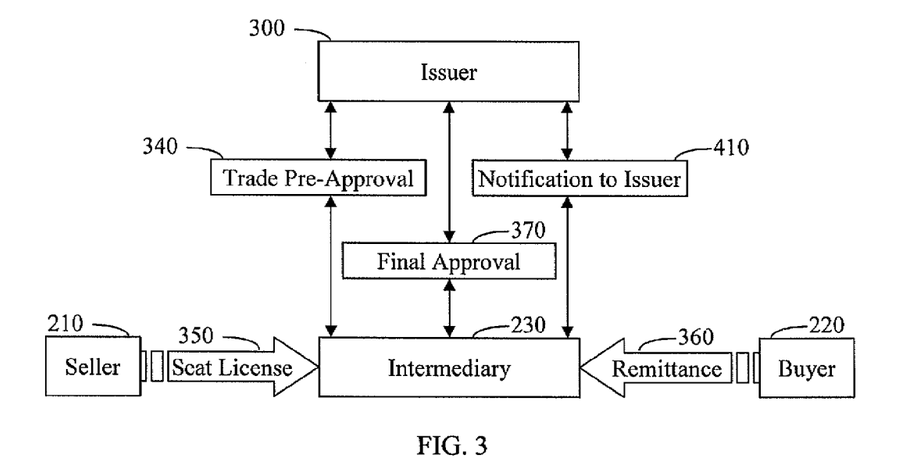
FIG. 3 is a schematic representation of a method of conducting a PSL trade according to one embodiment of the present invention illustrating functions of the intermediary after initiating the trade.
Figure 4:
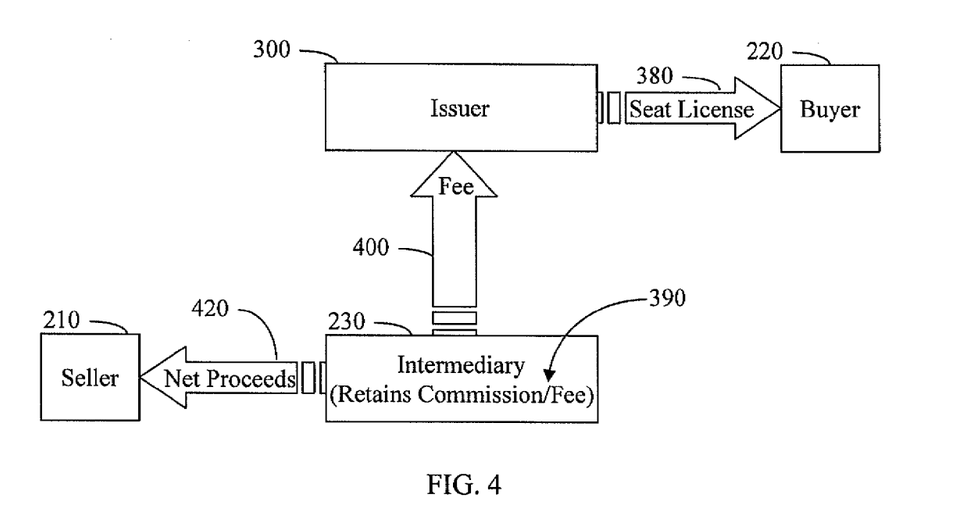
FIG. 4 is a schematic representation of a method of conducting a PSL trade according to one embodiment of the present invention illustrating functions of the intermediary in completing the trade.

FIGS. 2, 3, and 4, are schematic representations of a method of trading a permanent seat license according to one embodiment of the present invention. As shown in FIG. 2, several events must occur prior to the initiation of an actual trade of a permanent seat license. Generally, the seller 210 and the bidder 220 are required to register with the intermediary 230 prior to their respective participation in the PSL exchange 240, typically through the seller's computer 140, and the bidder's computer 130, respectively. In some instances, the information 250 provided by the bidder 220 to the intermediary 230, includes, for example, a name, address, telephone number, and other like information, as well as information relating to the bidder's 220 ability to pay for a PSL on which the bidder 220 successfully bids. Once the bidder 220 is registered with the intermediary 230, a credit verification process 260 is performed by the intermediary 230 whereby the bidder's 220 credit is verified with, for example, a credit agency 270. Such a credit verification process 260 may occur prior to allowing the bidder 220 to place a bid on a PSL. In some instances, a certain credit level corresponding to the bidder's 220 credit information may be, for example, provided to the seller 210 if the bidder 220 successfully bids on the seller's 210 PSL's such that the seller 210 is able to evaluate the creditworthiness of the bidder 220 in arranging the details of the trade. Further, in other instances, the bidder's 220 credit information may, automatically or otherwise, preclude the bidder 220 from bidding over a specified amount for a PSL. A seller 210 seeking to sell a PSL then registers with the intermediary 230 by providing information 280 such as, for example, the seller's 210 name, address, telephone number, and other pertinent information, along with the seat information corresponding to the PSL. After collecting the seller's 210 information, the intermediary 230 performs a title verification process 290 with the issuer 300 of the PSL to verify that the seller 210 is the rightful owner of the PSL.

Once registered, the seller 210 is thereafter permitted to list PSL's 310 on the PSL exchange 240. The PSL listing 310 may comprise, for example, the team and/or stadium for which the PSL's are to be sold, the corresponding seats within that stadium, and the respective asking price of each PSL. Once the PSL's are listed on the PSL exchange 240, a registered bidder 220 is permitted to place one or more bids 320 for any of the listed PSL's. In some instances, the PSL's on which the registered bidder 220 may bid may be limited by applicable constraints found by the intermediary 230 during the credit verification process 260.

Once PSL's have been listed on the PSL exchange 240 and bids 320 are received therefor, the PSL exchange 240 functions, for example, in a stock exchange format wherein a particular PSL may have a bid price and an ask price. A "market value" of the PSL may also be indicated and may correspond to, for instance, the price at which the last sale price at which that PSL or a similar PSL was sold. For example, a PSL may be shown with a last sale price of $10,000.00 and, as currently listed, may have an ask price determined by the seller 210 of $10,500.00 and a bid price offered by a bidder 220 of $9,500.00. In such an instance, both the seller 210 and the bidder 220 have the ability to alter or cancel the ask price and the bid price, respectively. In some instances, the seller 210 and the buyer 220 may also be able to consider the number of PSL's for sale in order to reach an agreement with regard to a purchase price, where, for example, the seller 210 may be able to reconfigure the number of PSL's in his listing (i.e.: agree to sell two PSL's out of four PSL's in the seller's 210 listing). Such a stock exchange format may be otherwise termed a "double auction" process, wherein such a format as that involved in the sale of stocks and other securities is known to one skilled in the art and will not be described further herein. Note that both the seller 210 and the bidder 220 may be allowed to monitor the status of the process through, for example, the trade status information module 160 or directly through the seat license exchange 120. In some instances, the seller 210 and/or the bidder 220 may be automatically notified of a change in the status of the process by, for example, an electronic message sent by the trade status information module 160, the seat license exchange 120, or the intermediary, via the central computer 110, over the network communication lines 150.

In accordance with the interaction between the seller 210 and the bidder 220 on the PSL exchange 240, a trade is initiated when a bid price is greater than or equal to the ask price for a particular PSL. Note that the required trade initiation condition may be obtained by a bidder 220 revising a bid price and/or by a seller 210 revising the ask price for that particular PSL. Once an agreement is reached between the seller 210 and the bidder 220, the details of the agreement are stored in a trade archive 330, the trade archive 330 comprising, for example, a database stored on the intermediary's computer 110, and the corresponding listing is from the PSL exchange 240. The trade archive 330 may also serve other purposes associated with the PSL exchange 240. For example, the seller 210 may be able to access the trade archive 330 in order to research a typical market price for the same or similar PSL to which the seller is seeking to list on the PSL exchange 240. Such a market price is preferably determined from the sale of similar PSL's, wherein a similar PSL corresponds to, for example, a seat in the same section of the arena/stadium as the PSL that the seller 210 is seeking to sell. In other instances, both the seller 210 and the bidder 220 may be able to access a historical trading record of the same or similar PSL's stored in the trade archive 330. Such a history may be presented in graphical form showing, for instance, the effect on PSL values following a winning season as well as a losing season, along with the effect of championships or other distinctions. In some instances, the historical information may include ads, or compilations thereof from, for example, newspaper classifieds or computer bulletin boards, showing similar PSL's advertised for sale along with the associated ask price. Such historical information in the trade archive 330 may assist the seller 210 in determining an appropriate ask price at which to list the PSL on the PSL exchange 240 and may also assist the bidder 220 in determining an appropriate bid for that PSL.

In some instances, the issuer 300 may have PSL's returned thereto by the owner, whereinafter, the issuer 300 may become interested in reselling the PSL. However, the issuer 300 is generally precluded from participating in the PSL exchange 240, though there may be instances where the issuer 300 may be allowed to participate in the PSL exchange 240 as a private seller 210. The issuer 300, on the other hand, may be permitted access to the trade archive 330 in order to research a market price for the PSL. It will be understood, however, that the information provided in the trade archive 330 is not limited solely to market price information with respect to the PSL. The seller 210, buyer 220, and/or issuer 300 may be provided with other pertinent information necessary for the respective party to make an informed determination as to the pricing of a particular PSL or a bid therefor. For example, the bidder 220 may also be able to see a view of the playing field from the particular seat corresponding to the PSL or, more generally, from the corresponding section of the arena/stadium. Such a view may take the form of, for example, photographs or other digital images depicting what a person may actually see when sitting in that seat or in that section of the arena. Thus, for instance, the bidder 220 may be able to evaluate whether the seat is too far from the playing field to afford the view that he desires.

In some instances, the PSL exchange 240 may be used for other purposes such as, for example, to allow the sellers 210 and the bidders 220 to incorporate unlisted PSL's into a transaction. For example, a seller 210 may be able to post a notice of willingness to list unlisted PSL's upon receiving a corresponding solicitation from a bidder 220. For instance, a seller 210 may list a pair of PSL's for sale on the PSL exchange 240, but post a notice to the effect that an additional pair of adjacent PSL's may also be available for an interested party. Thus, if a bidder 220 is interested in purchasing four PSL's, instead of just two, the bidder 220 may send a solicitation to the seller 210 notifying the seller 210 of the bidder's 220 interest in obtaining the other two unlisted PSL's. In this manner, the seller 210 can include the remaining two PSL's with the two previously listed PSL's such that the bidder 220 may be able to bid on a package of four PSL's. Conversely, the bidder 220 may also be able to post a solicitation for the specific PSL's that the bidder 220 seeks. For example, if the bidder 220 cannot find a desired PSL listed on the PSL exchange 240, the bidder may post a notice of interest to buy particular PSL's in a particular section of a particular stadium or a notice of interest for a particular number of PSL's in a particular stadium. More particularly, if the bidder 220 finds only pairs of PSL's listed on the PSL exchange 240, and the bidder 220 seeks four PSL's, the bidder 220 may post a solicitation for any seller 210 willing to sell four PSL's corresponding to four consecutive seats in that stadium. Where either a seller's 210 or bidder's 220 notice of interest is met with an agreement from a respective opposing party, the trade can be conducted through the PSL exchange 240 in accordance with the principles previously discussed. Note that, in some instances, the PSL exchange 240 may include provisions for automatically searching for matches for the sellers' and/or bidders' solicitations. For example, after a seller's notice of willingness has been received, a database of bidders' notices of interest may be automatically searched to find a potential match for the seller's offer. Conversely, upon receipt of a bidder's notice of interest, a database of sellers' notices of willingness may be automatically searched to find a potential match for the bidder's solicitation.

If a seller 210 and a bidder 220 reach an agreement whereby the bid price offered by the bidder 220 is greater than or equal to the ask price of the PSL requested by the seller 210, a trade is initiated as shown in FIG. 3. Once a trade is initiated, the intermediary 230 submits a trade pre-approval request 340 to the issuer 300, while both the seller 210 and the bidder 220, now known as the buyer 220, are notified by the intermediary 230 with instructions on completing the trade. The issuer 300 may, for example, return a non-binding approval of the trade for the identified parties or may invalidate the trade for a variety of reasons. If the trade is invalidated, the buyer 220 is notified of the cause by the issuer 300 and/or the intermediary 230 and the PSL is then relisted on the PSL exchange 240. However, if the issuer 300 returns a pre-approval of the trade, the seller 210 directs the seat license 350 to the intermediary 230 and the buyer 220 directs a remittance 360 at least equal to the accepted bid for the PSL to the intermediary 230. The intermediary 230 may further require that the seller 210 and the buyer 220 complete respective forms accompanying the seat license 350 and the remittance 360, wherein the respective forms may include provisions as to, for example, fees to be paid to the issuer 300 and to the intermediary 230 in facilitation of the trade and authorizations for the transfer of the title to the seat license 350 between the parties. Further, the intermediary 230 may impose a time limit within which to receive the seat license 350 and the corresponding remittance 360 from the respective parties. Should either the seat license 350 or the remittance 360 not be received within the specified period, the trade may be cancelled and the PSL relisted on the PSL exchange 240 or, for example, the offending party may be charged a penalty fee. Note that the seller 210 and the buyer 220 may also be permitted to monitor this portion of the trade through, for example, the trade status information model 160 and, in some instances, may be automatically notified upon changes in the status of the trade.

Once the intermediary 230 receives the seat license 350 and the corresponding remittance 360 within the specified period of time, a final approval of the trade 370 is requested from the issuer 300 by submitting the seller information and the buyer information thereto, along with any applicable forms such as the seat license 350 and the transfer authorizations from the parties. According to some embodiments, however, the PSL trade may also include a separate transaction between the seller 210 and the buyer 220 for season tickets associated with the PSL being sold. For example, the seller 210 may sell the PSL while retaining the corresponding season tickets for all or part of the current remaining season. In cases where the seller 210 separates the season tickets from the PSL, a separate transaction may also be conducted over the PSL exchange 240 between the seller 210 and a buyer 220 together with or independently of the PSL trade, wherein the season ticket transaction may also include a fee imposed by the intermediary 230. If an agreement as to the sale of the current season tickets is reached between a seller 210 and a buyer 220, the seller 210 directs the associated tickets to the intermediary 230, while the buyer 220 directs a supplemental remittance to the intermediary 230 corresponding to the agreed price for the associated season tickets plus any applicable fee.

As shown in FIG. 4, after the issuer 300 provides a final approval of the trade, the intermediary 230 directs the seat license 380 to the buyer 220 such that the buyer 220 receives a seat license 380 that is complete with respect to transference of ownership to the buyer 220. Typically, the seat license 380 is sent from the issuer 300 to the buyer 220 at the direction of the intermediary 230. However, there may be instances where, by agreement, the seat license 380 may be sent from the issuer 300 to the intermediary 230, before being sent to the buyer 220. In other instances, the intermediary 230 and the issuer 300 may comprise the same entity, whereby the seat license 380 would then be sent to the buyer 220 by the intermediary 230/issuer 300. Thus, it will be understood that the term "directing" may comprise an instruction, authorization, or the like and/or may comprise an act of sending, delivering, or the like. Further, from the remittance 360 provided by the buyer 220 to the intermediary 230, the intermediary 230 retains a pre-agreed commission or fee 390 while directing an additional fee 400 to the issuer 300 if so required by the issuer 300. At the same time, the intermediary 230 sends a notification 410 to the issuer 300 notifying the issuer 300 of the completion of the trade, wherein the notification 410 indicates that the seller 210 is no longer the owner of the PSL and the title to the PSL now belongs to the buyer 220, for example, either by signifying a closure of the trade to the issuer 300 or by notifying the issuer 300 to send the title to the PSL to the buyer 220 to close the trade. Following the deduction of the intermediary's fee 390 and the issuer's fee 400, the intermediary 230 directs the net proceeds 420 to the seller 210 in accordance with the original agreements.

Thus, embodiments of the present invention provide methods and associated systems for trading permanent seat licenses in which reasonable assurances are provided to both the buyer 220 and the seller 210 over the course of the transaction, wherein such assurances were generally absent with direct transaction between the buyer 220 and the seller 210. Further, embodiments of the present invention provides both parties, as well as the issuer 300, with current market prices for the respective PSL's, the capability of allowing the buyer 220 to evaluate views of the playing field from the corresponding seats, the capability of providing the parties with the transaction requirements imposed by the respective issuers 300, and the capability of providing other information so as to allow the parties to be sufficiently informed prior to participating in the seat license exchange. Embodiments of the present invention also provide a trusted intermediary for facilitating the transaction, whereby the seller 210 submits the PSL and the buyer 220 submits the corresponding remittance to a third party under mutual agreement for the conduct of the transaction. Embodiments of the present invention also provide a mechanism whereby the season tickets corresponding to the PSL may be transacted together with or independently of the sale of the PSL. Therefore, embodiments of the present invention provide distinct advantages in the trading of permanent seat licenses.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of trading seat licenses over a computer network, comprising:
    listing a seat license for sale by a seller on a seat license exchange hosted by an intermediary, the seat license exchange being conducted through a central computer over the computer network, the seat license being issued by an issuer and having an asking price determined by the seller;
    receiving at least one bid for the seat license over the computer network from a bidder;
    designating the bidder offering a first bid for the seat license that is at least equal to the asking price thereof as a buyer of the seat license;
    initiating a trade by removing the seat license listing from the seat license exchange and establishing a trade status;
    receiving a title to the seat license from the seller;
    receiving a remittance at least equal to the first bid from the buyer;
    receiving a final approval of the trade from the issuer; and
    completing the trade by directing the title to the seat license to the buyer, directing a first portion of the remittance to the intermediary, directing a second portion of the remittance to the seller, and notifying the issuer of the completion of the trade.

2. A method according to claim 1 further comprising registering the seller by receiving seller information, seat license information, and associated ticket information prior to listing the seat license for sale.

3. A method according to claim 2 further comprising confirming with the issuer that the seller has a proper title to the seat license prior to listing the seat license for sale.

4. A method according to claim 2 further comprising allowing the seller to post a notice of willingness to list an unlisted seat license for sale upon a solicitation from a bidder, the notice being accessible to the bidder.

5. A method according to claim 1 further comprising registering the bidder by receiving bidder information prior to receiving the at least one bid.

6. A method according to claim 5 further comprising verifying the bidder as being capable of remitting the at least one bid prior to receiving the at least one bid from the bidder.

7. A method according to claim 5 further comprising allowing the bidder to list a solicitation for an unlisted seat license, wherein the solicitation is accessible to the seller.

8. A method according to claim 1 further comprising allowing the seller to revise the seat license listing following listing of the seat license.

9. A method according to claim 1 further comprising requesting a pre-approval of the trade from the issuer prior to initiating the trade.

10. A method according to claim 9 further comprising re-listing the seat license if the issuer denies the pre-approval of the trade.

11. A method according to claim 1 further comprising receiving a season ticket associated the seat license from the seller following initiation of the trade.

12. A method according to claim 11 further comprising receiving a supplemental remittance for the season ticket from the buyer.

13. A method according to claim 12 wherein completing the trade further comprises directing the season ticket associated with the seat license to the buyer, directing a first portion of the supplemental remittance to the intermediary, and directing a second portion of the supplemental remittance to the seller.

14. A method according to claim 1 further comprising canceling the trade if the intermediary fails to receive at least one of the title and the remittance within a specified period.

15. A method according to claim 1 further comprising allowing at least one of the buyer, the seller, and the issuer to access the trade status over the computer network.

16. A method according to claim 1 further comprising allowing at least one of the buyer, seller, and intermediary to access the seat license listing, the asking price, and the at least one bid over the computer network.

17. A method according to claim 1 wherein the seat license corresponds to a particular seat at a particular venue and the method further comprises providing a view of the venue from the seat such that the view is accessible over the computer network.

18. A method according to claim 16 wherein the seat license listing, the asking price, and the at least one bid for a completed trade are stored in an archive and the method further comprises allowing access to the archive over the computer network.

19. A method according to claim 1 wherein completing the trade further comprises directing a third portion of the remittance to the issuer as a payment of a transaction fee.

20. A method according to claim 1 further comprising linking other information associated with the seat license to the seat license listing such that the other associated information is accessible over the computer network.

21. A system capable of allowing seat licenses to be traded over a computer network, comprising:
a computer device in communication with the computer network for establishing a seat license exchange, comprising:
a first processing portion configured to list a seat license for sale by a seller on the seat license exchange, the seat license exchange being hosted by an intermediary, the seat license being issued by an issuer and having an asking price determined by the seller;
a second processing portion configured to receive at least one bid for the seat license over the computer network from a bidder;
a third processing portion configured to designate the bidder offering a first bid for the seat license that is at least equal to the asking price thereof as a buyer of the seat license;
a fourth processing portion configured to initiate a trade by removing the seat license listing from the seat license exchange and establishing a trade status;
a fifth processing portion configured to direct a title to the seat license from the seller to the intermediary;
a sixth processing portion configured to direct a remittance at least equal to the first bid from the buyer to the intermediary;
a seventh processing portion configured to receive a final approval of the trade from the issuer; and
an eighth processing portion configured to complete the trade by directing the title to the seat license to the buyer, directing a first portion of the remittance to the intermediary, directing a second portion of the remittance to the seller, and notifying the issuer of the completion of the trade.

22. A system according to claim 21 further comprising a ninth processing portion configured to register the seller by receiving seller information, seat license information, and associated ticket information prior to listing the seat license for sale.

23. A system according to claim 22 further comprising a tenth processing portion configured to confirm with the issuer that the seller has a proper title to the seat license prior to listing the seat license for sale.

24. A system according to claim 22 further comprising an eleventh processing portion configured to allow the seller to post a notice of willingness to list an unlisted seat license for sale upon a solicitation from a bidder such that the notice is accessible to the bidder.

25. A system according to claim 21 further comprising a twelfth processing portion configured to register the bidder by receiving bidder information prior to receiving the at least one bid.

26. A system according to claim 25 further comprising a thirteenth processing portion configured to verify the bidder as being capable of remitting the at least one bid prior to the second processing portion receiving the at least one bid from the bidder.

27. A system according to claim 25 further comprising a fourteenth processing portion configured to allow the bidder to list a solicitation for an unlisted seat license such that the solicitation is accessible to the seller.

28. A system according to claim 21 further comprising a fifteenth processing portion configured to allow the seller to revise the seat license listing following listing of the seat license.

29. A system according to claim 21 further comprising a sixteenth processing portion configured to request a pre-approval of the trade from the issuer prior to initiating the trade.

30. A system according to claim 29 further comprising a seventeenth processing portion configured to re-list the seat license if the issuer denies the pre-approval of the trade.

31. A system according to claim 21 further comprising an eighteenth processing portion configured to direct a season ticket associated the seat license from the seller to the intermediary following initiation of the trade.

32. A system according to claim 31 further comprising a nineteenth processing portion configured to direct a supplemental remittance for the season ticket from the buyer to the intermediary.

33. A system according to claim 32 wherein eighth processing portion is further configured to direct the season ticket associated with the seat license to the buyer, direct a first portion of the supplemental remittance to the intermediary, and direct a second portion of the supplemental remittance to the seller.

34. A system according to claim 21 further comprising a twentieth processing portion configured to cancel the trade if the intermediary fails to receive at least one of the title and the remittance within a specified period.

35. A system according to claim 21 further comprising a twenty-first processing portion configured to allow at least one of the buyer, the seller, and the issuer to access the trade status over the computer network.

36. A system according to claim 21 further comprising a twenty-second processing portion configured to allow at least one of the buyer, seller, and intermediary to access the seat license listing, the asking price, and the at least one bid over the computer network.

37. A system according to claim 21 wherein the seat license corresponds to a particular seat at a particular venue and the system further comprises a twenty-third processing portion configured to provide a view of the venue from the seat such that the view is accessible over the computer network.

38. A system according to claim 36 wherein the seat license listing, the asking price, and the at least one bid for a completed trade are stored in an archive and the system further comprises a twenty-fourth processing portion configured to allow access to the archive over the computer network.

39. A system according to claim 21 wherein the eighth processing portion is further configured to direct a third portion of the remittance to the issuer as a payment of a transaction fee.

40. A system according to claim 21 further comprising a twenty-fifth processing portion configured to link other information associated with the seat license to the seat license listing such that the other associated information is accessible over the computer network.

41. A method of selling a seat license owned by a seller on a seat license exchange, comprising:
listing the seat license for sale on the seat license exchange, the seat license exchange being hosted by an intermediary and being conducted through a central computer over a computer network, the seat license being issued by an issuer and having an asking price determined by the seller;

receiving at least one bid for the seat license over the computer network from a bidder, wherein the at least one bid includes a first bid for the seat license that is at least equal to the asking price thereof, the bidder thereafter being designated as the buyer of the seat license;

sending a title to the seat license to the intermediary;

receiving a final approval of the trade from the issuer; and receiving at least a portion of a buyer's remittance from the intermediary.

42. A method according to claim 41 further comprising sending seller information, seat license information, and associated ticket information to the intermediary prior to listing the seat license for sale.

43. A method according to claim 42 further comprising posting a notice of willingness to list an unlisted seat license for sale upon a solicitation from a bidder, the notice being accessible to the bidder.

44. A method according to claim 41 further comprising revising the seat license listing following listing of the seat license.

45. A method according to claim 41 further comprising sending the title to the intermediary within a specified period.

46. A system capable of allowing seat licenses to be traded over a computer network, comprising:

a bidder's computer in communication with the computer network;

a seller's computer in communication with the computer network; and a central computer device in communication with the computer network for establishing a seat license exchange, the central computer device being communicable with the bidder's computer and the seller's computer, the central computer device comprising:

a first processing portion configured to receive a listing for a seat license for sale by a seller through the seller's computer and to list the seat license on the seat license exchange, the seat license exchange being hosted by an intermediary, the seat license being issued by an issuer and having an asking price determined by the seller;

a second processing portion configured to receive at least one bid for the seat license over the computer network from a bidder through the bidder's computer;

a third processing portion configured to designate the bidder offering a first bid for the seat license that is at least equal to the asking price thereof as a buyer of the seat license;

a fourth processing portion configured to initiate a trade by removing the seat license listing from the seat license exchange and establishing a trade status;

a fifth processing portion configured to direct a title to the seat license from the seller to the intermediary;

a sixth processing portion configured to direct a remittance at least equal to the first bid from the buyer to the intermediary;

a seventh processing portion configured to receive a final approval of the trade from the issuer; and an eighth processing portion configured to complete the trade by directing the title to the seat license to the buyer, directing a first portion of the remittance to the intermediary, directing a second portion of the remittance to the seller, and notifying the issuer of the completion of the trade.

47. A system according to claim 46 wherein the central computer device further comprises a ninth processing portion configured to register the seller by receiving seller information, seat license information, and associated ticket information prior to listing the seat license for sale.

48. A system according to claim 47 wherein the central computer device further comprises a tenth processing portion configured to confirm with the issuer that the seller has a proper title to the seat license prior to listing the seat license for sale.

49. A system according to claim 46 wherein the central computer device further comprises an eleventh processing portion configured to register the bidder by receiving bidder information prior to receiving the at least one bid.

50. A system according to claim 49 wherein the central computer device further comprises a twelfth processing portion configured to verify the bidder as being capable of remitting the at least one bid prior to the second processing portion receiving the at least one bid from the bidder.

51. A system according to claim 46 wherein the central computer device further comprises a thirteenth processing portion configured to allow the seller to revise the seat license listing following listing of the seat license.

52. A system according to claim 46 wherein the central computer device further comprises a fourteenth processing portion configured to request a pre-approval of the trade from the issuer prior to initiating the trade.

53. A system according to claim 52 wherein the central computer device further comprises a fifteenth processing portion configured to re-list the seat license if the issuer denies the pre-approval of the trade.

54. A system according to claim 46 wherein the central computer device further comprises a sixteenth processing portion configured to cancel the trade if the intermediary fails to receive at least one of the title and the remittance within a specified period.

55. A system according to claim 46 wherein the central computer device further comprises a seventeenth processing portion configured to allow at least one of the buyer, the seller, and the issuer to access the trade status over the computer network.

56. A system according to claim 46 wherein the eighth processing portion is further configured to direct a third portion of the remittance to the issuer as a payment of a transaction fee.

* * * * *

UNITED STATES PATENT AND TRADEMARK OFFICE
CERTIFICATE OF CORRECTION

PATENT NO. : 7,099,841 B1  Page 1 of 1
APPLICATION NO. : 09/632699
DATED : August 29, 2006
INVENTOR(S) : Hall et al.

It is certified that error appears in the above-identified patent and that said Letters Patent is hereby corrected as shown below:

Column 12,
Line 37, after "associated" insert --with--.

Column 14,
Line 16, after "associated" insert --with--.

Signed and Sealed this

Twentieth Day of February, 2007

JON W. DUDAS
*Director of the United States Patent and Trademark Office*